United States Patent [19]

Wu

[11] Patent Number: 5,421,604
[45] Date of Patent: Jun. 6, 1995

[54] GOLF CART FOLDING FRAME ASSEMBLY

[76] Inventor: Ching-Chang Wu, No. 35-1, Jih Hsin Street, Tu Cheng Hsiang, Taipei Hsien, Taiwan, Prov. of China

[21] Appl. No.: 240,139

[22] Filed: May 10, 1994

[51] Int. Cl.⁶ .............................................. B62B 1/12
[52] U.S. Cl. .................................. 280/655; 280/47.26; 280/47.315; 280/DIG. 6
[58] Field of Search ............... 280/47.26, 47.18, 47.19, 280/47.23, 47.24, 47.27, 47.28, 47.315, 63, DIG. 6, 654, 655, 655.1

[56] References Cited

U.S. PATENT DOCUMENTS

| | | | |
|---|---|---|---|
| 2,761,691 | 9/1956 | George | 280/47.19 |
| 2,800,953 | 7/1957 | Goehler et al. | 280/47.19 |
| 3,081,108 | 3/1963 | Vogt | 280/47.19 |
| 4,946,186 | 8/1990 | Cheng | 280/655 |
| 4,974,871 | 12/1990 | Mao | 280/655 |
| 5,004,254 | 4/1991 | Wu | 280/47.315 |
| 5,143,399 | 9/1992 | Liu | 280/655 |
| 5,288,099 | 2/1994 | Wu | 280/655 |

*Primary Examiner*—Margaret A. Focarino
*Assistant Examiner*—Anne Marie Boehler
*Attorney, Agent, or Firm*—Varndell Legal Group

[57] ABSTRACT

A golf cart folding frame assembly includes a folding frame bar mounting structure and a telescopic drag bar mounting structure. The folding frame bar mounting structure includes a first connecting frame mounted on the rear end of a frame bar and having inner and outer locating notches on two opposite, arched side walls thereof, a second connecting frame mounted on the front end of a frame member and having two sliding slots on two opposite side walls thereof, a locating device having two locating rods inserted into the sliding slots and controlled by a spring supported control knob to alternatively engage into the inner or outer locating notches so as to lock the fold frame bar mounting structure in the operative or collapsed position.

1 Claim, 11 Drawing Sheets

GOLF CART FOLDING FRAME ASSEMBLY

BACKGROUND AND SUMMARY OF THE INVENTION

The present invention relates to golf carts, and more particularly to a folding frame assembly for a golf cart.

Figure 1:
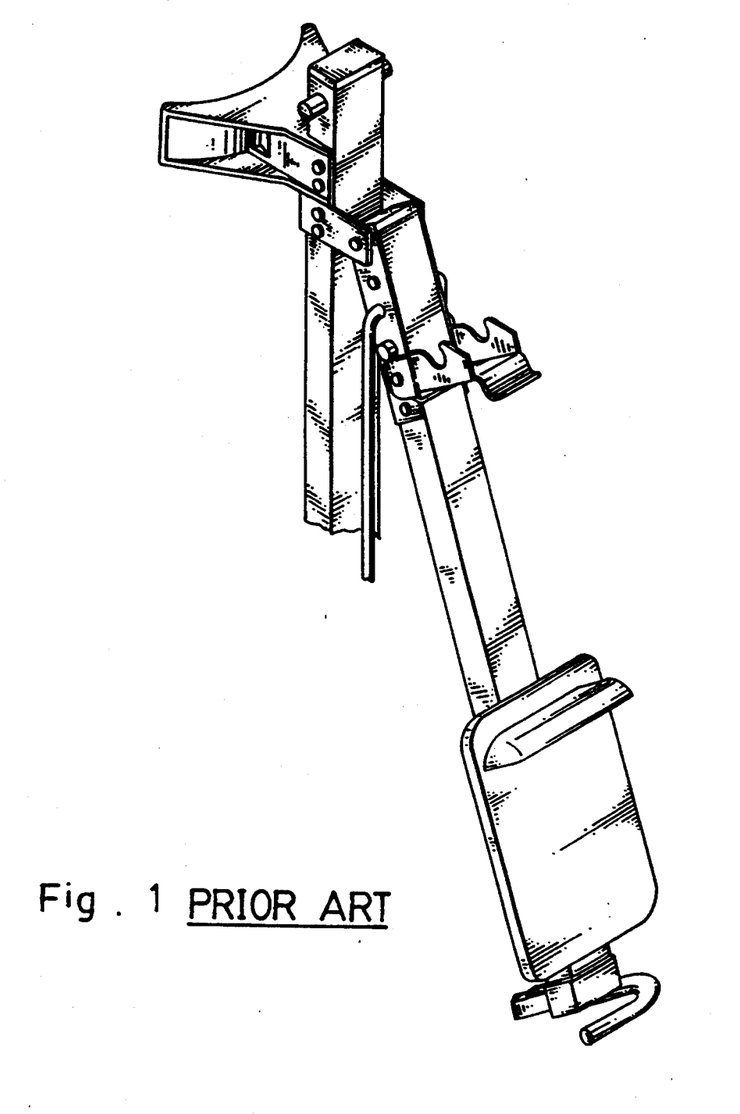
FIG. 1 is a perspective view of a folding frame assembly for a golf cart according to the prior art.
Figure 2:
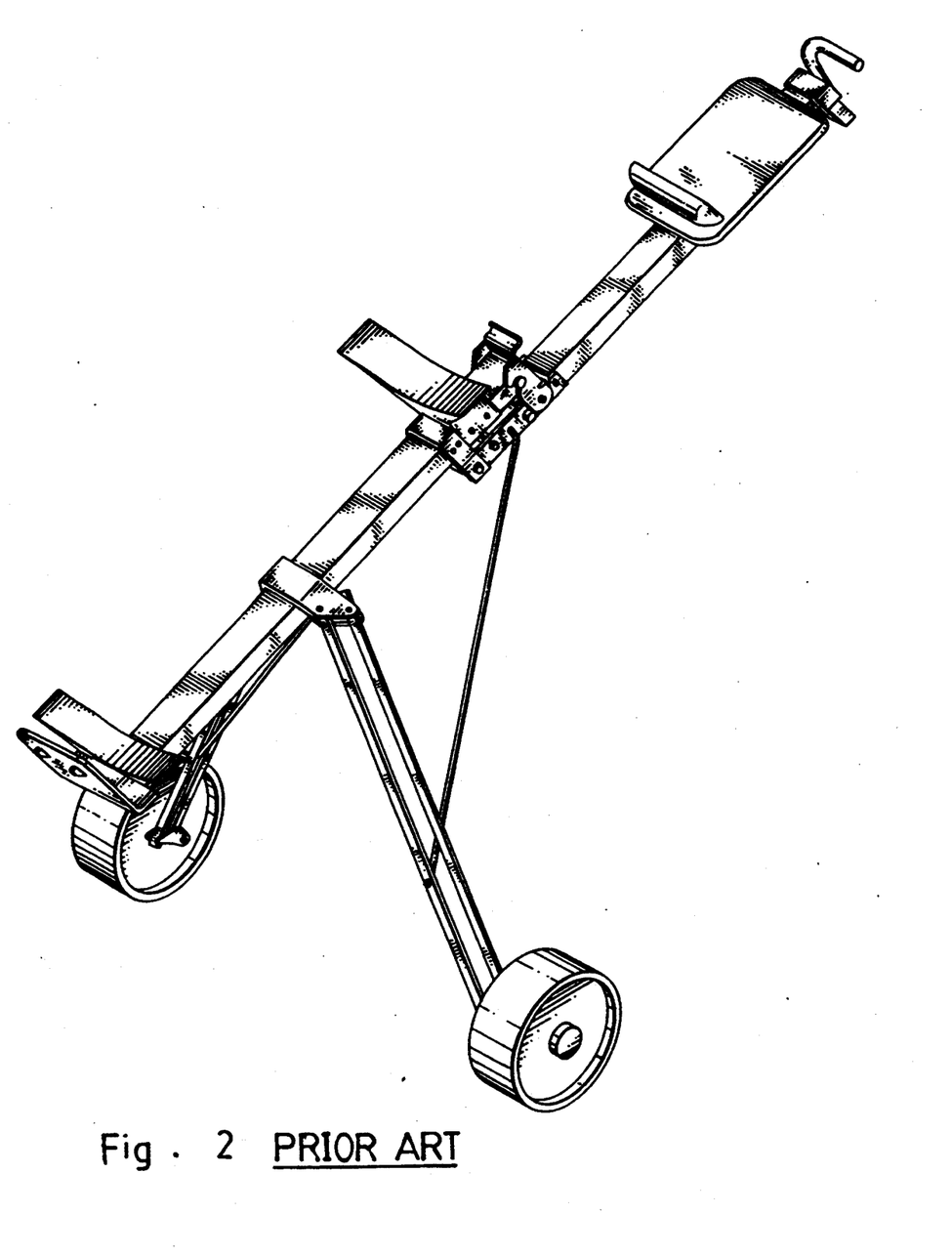
FIG. 2 is a perspective elevational view of the golf cart according to FIG. 1.
Figure 3:
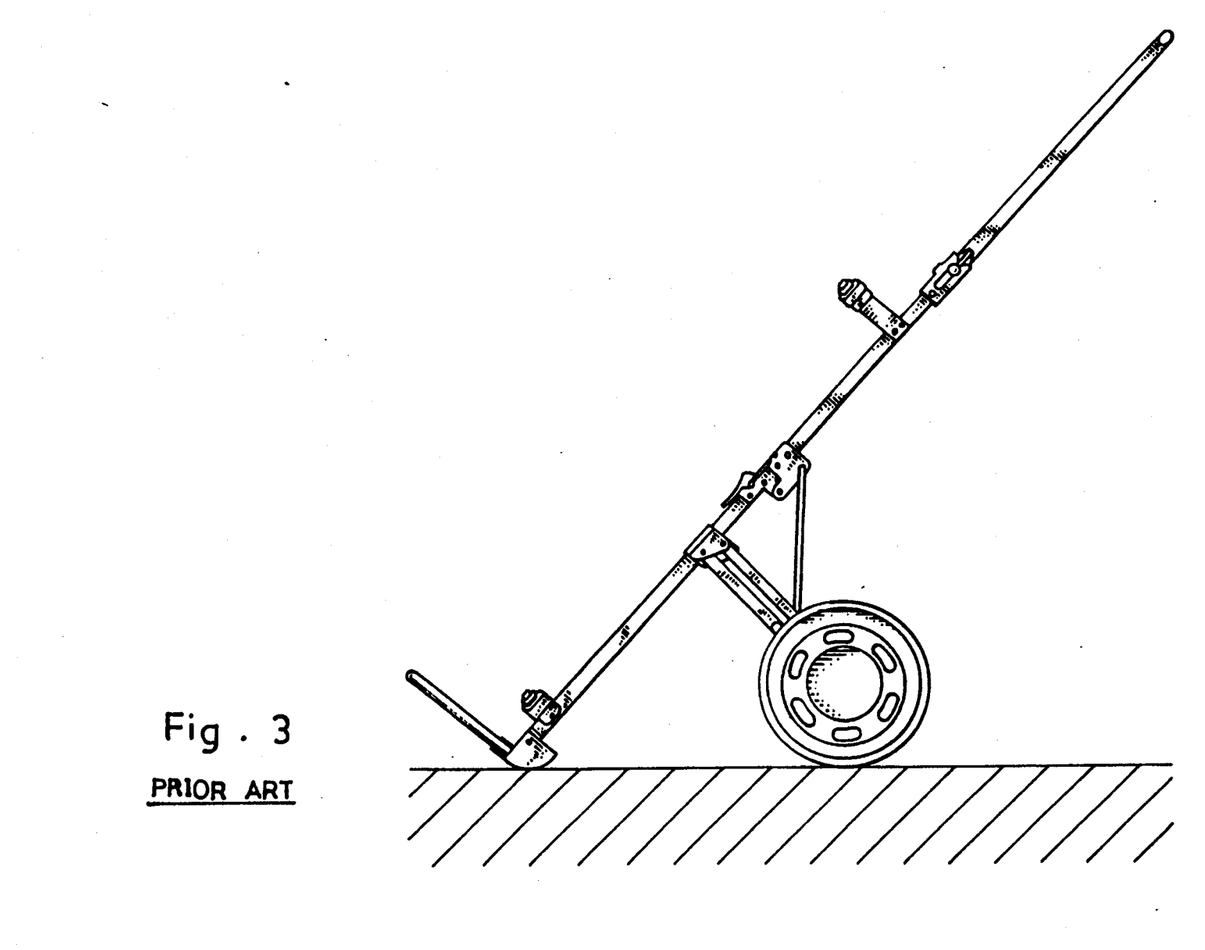
FIG. 3 is a side view of a telescopic and collapsible golf cart as disclosed in U.S. Pat. No. 33,939.
Figure 4A:
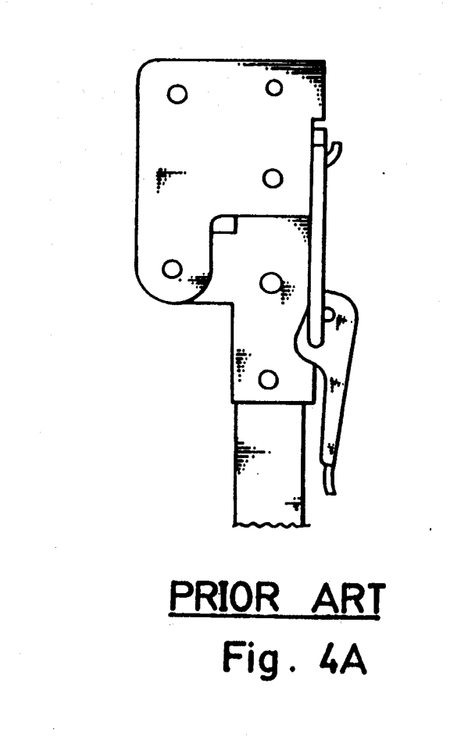
FIG. 4A is a partial view in an enlarged scale of the collapsible frame of the telescopic and collapsible golf cart shown in FIG. 3.
Figure 4B:
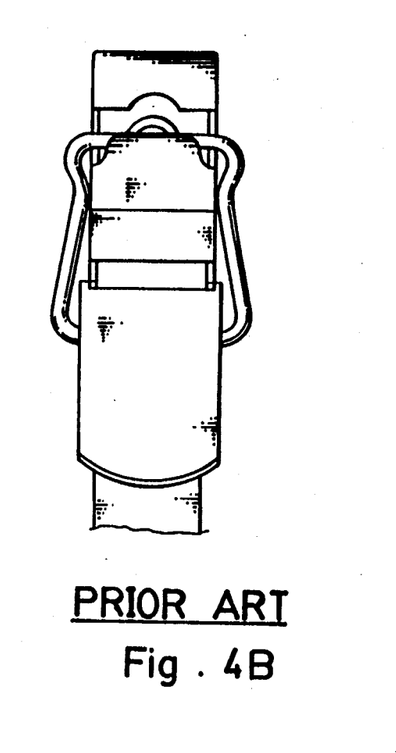
FIG. 4B is a front view of FIG. 4A.
Figure 4C:
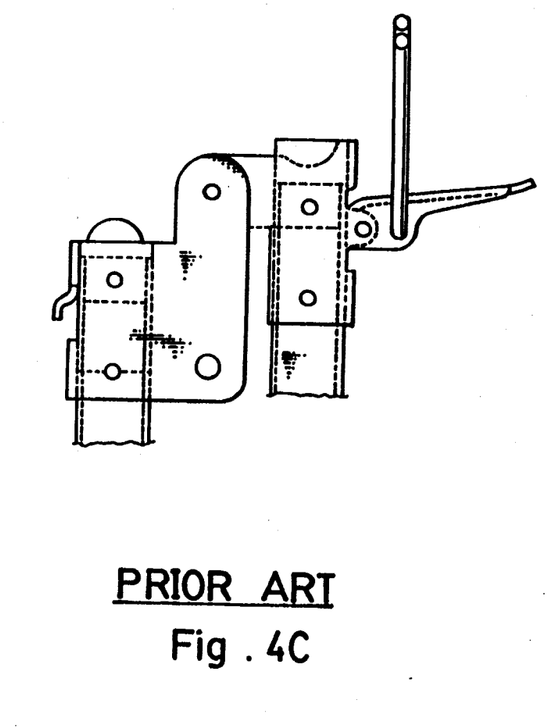
FIG. 4C shows the structure of FIG. 4A folded up.

FIGS. 1 and 2 show a regular golf cart, which comprises a frame member of rectangular configuration, two golf bag cradles mounted on the frame member at two opposite locations for carrying a golf bag with clubs, a bracket mounted on the frame member in the middle to hold a pair of ground supporting wheels by two side beams, a frame bar having a front end terminated into a hand grip and a rear end hinged to a front end of the frame member by a hinge means, a locking plate pivotably mounted on the frame bar adjacent to its rear end for locking the frame bar to a front end of the frame member in the operative position, and a pair of links pivotably connected between the rear end of the frame bar and the side beams at mid portions thereof. The locking plate has two retaining notches on two opposite side walls thereof and an unitary hand plate. By turning the hand plate with the hand, the locking plate is alternatively moved into the locking position with the two side pegs on the frame member respectively retained in the retaining notches for permitting the frame bar to be locked in the operative position, or the unlocking position with the two side pegs on the frame member released from the retaining notches for permitting the frame bar to be collapsed and closely attached to the frame member side by side. One drawback of this structure of golf cart is that the locking plate will become loosely connected to the side pegs on the frame member after long uses, causing a noise to produce upon moving of the golf cart. Another drawback of this structure of golf cart is that it is difficult to lock the locking plate on the side pegs.

There is another structure of telescopic and collapsible golf cart disclosed in U.S. Pat. No. Re. 33, 939, as shown in FIG. 3, 4A, 4B and 4C, which is generally comprised of a longitudinal frame member including a first section, a second section and a third section terminating in a handle and telescopically receivable within a hollow inner space of the second section; a base frame pivotally connected to the first section; a bracket secured to the first section; a pair of bag cradles secured to the first and second sections; a hinge means pivotally and laterally interconnecting the first section to the second section; a link member pivotally interconnecting the bracket to the hinge means; and second lock means for selectively locking the third section in a desired telescopic position with respect to the second section. In operation, the first section and the second section can be joined in aligned position through the engagement of male and female couplers and further locked in position by means of a lock member of the hinge means. On the contrary, the arm of the lock member can be swung counterclockwise to release to catch frame out of a hook on the bracket means, thereby permitting the second section to be swung counterclockwise into a position parallel to the first section. This operation procedure is complicated. Because this structure of telescopic and collapsible golf cart is constructed of a great number of parts, its assembly process is complicated, and its manufacturing cost is high. Still another disadvantage of this structure of telescopic and collapsible golf cart is that most parts of the golf cart may rust away easily because they are made from iron or rigid metal materials.

Figure 5:
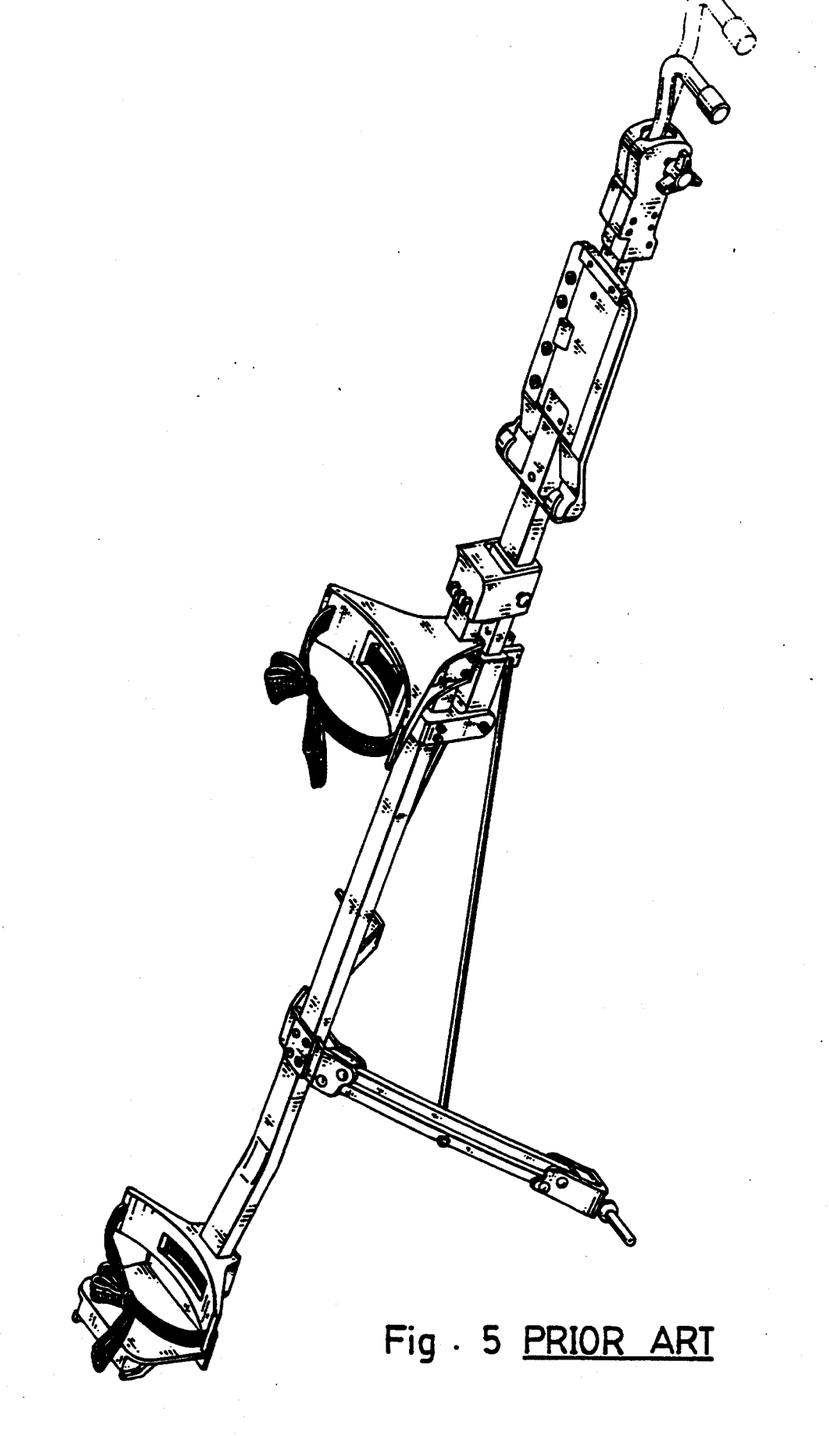
FIG. 5 is a perspective elevational view of a telescopic and folding frame assembly for a golf cart according to U.S. Pat. No. 5,288,099.
Figure 6:
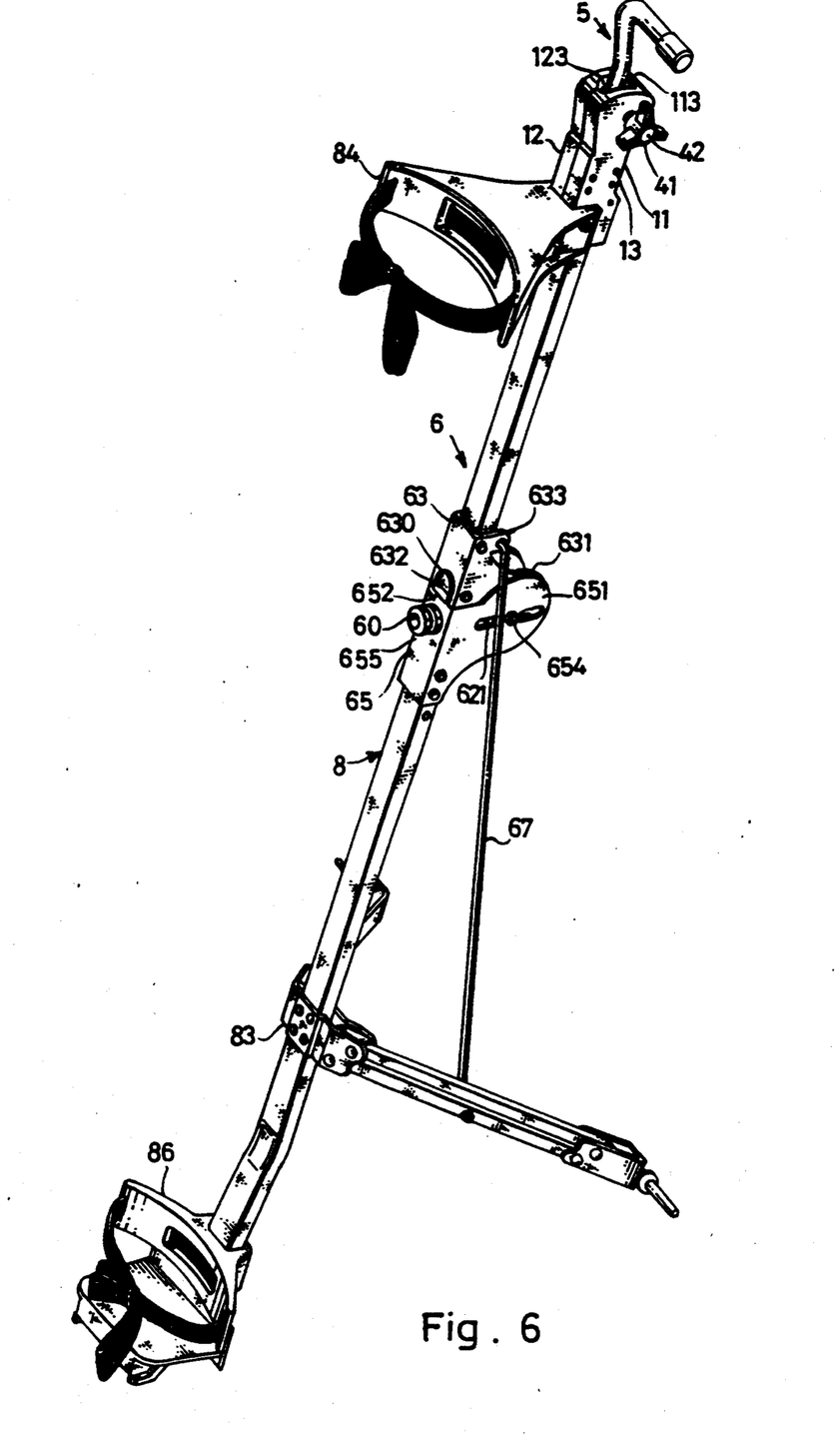
FIG. 6 is a perspective elevational view of a golf cart folding frame assembly according to the present invention.
Figure 7:
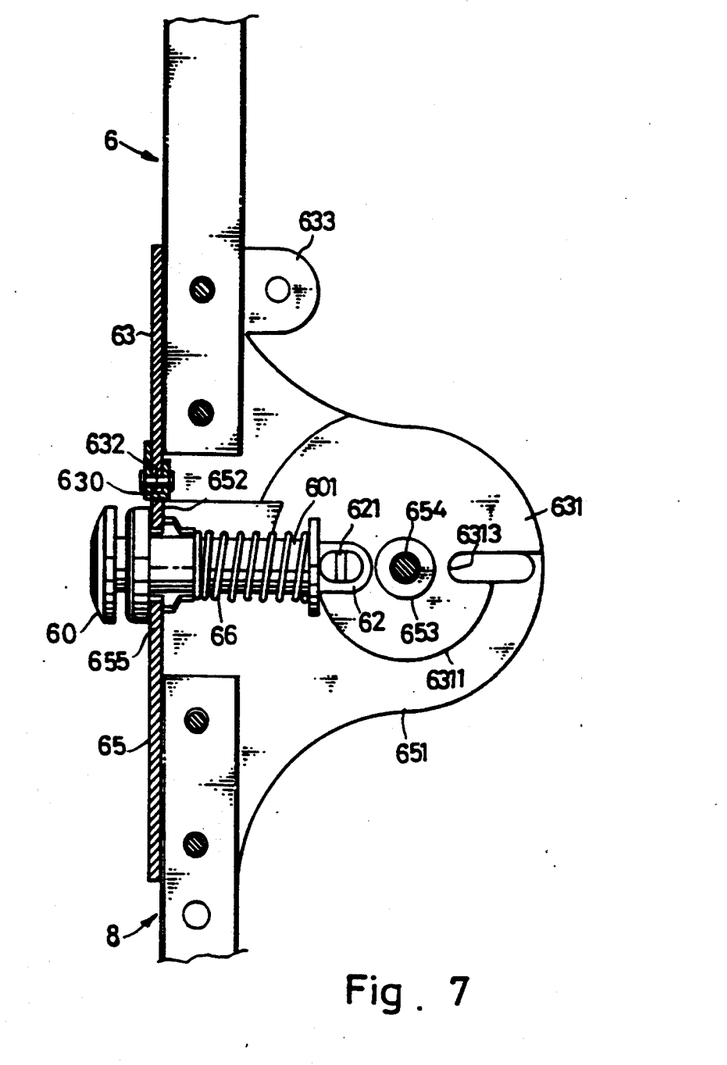
FIG. 7 is a side view in plain of the folding frame bar mounting structure of the golf cart folding frame assembly shown in FIG. 6.

U.S. Pat. No. 5,288,099, which is issued to the present inventor, discloses a telescopic and folding frame assembly for a golf cart, as shown in FIG. 5, generally comprised of a folding frame bar mounting structure and a telescopic drag bar mounting structure. This structure of telescopic and folding frame assembly is functional however, it may produce noises when extended from the collapsed position into the operative position, more particularly after long USES.

It is therefore an object of the present invention to provide a golf cart folding frame assembly which can be conveniently folded up into the collapsed position or turned into from the collapsed position to the operative position. It is another object of the present invention to provide a golf cart folding frame assembly which can be firmly locked in position to eliminate noises as the golf cart is moved. With these objects in view, there is provided a golf cart folding frame assembly comprised of folding frame bar mounting structure and a telescopic drag bar mounting structure. The folding frame bar mounting structure comprises a first connecting frame mounted on the rear end of a frame bar and having inner and outer locating notches on two opposite, arched side walls thereof, a second connecting frame mounted on the front end of a frame member and having two sliding slots on two opposite side walls thereof, a locating device having two locating rods inserted into the sliding slots and controlled by a spring supported control knob to alternatively engage into the inner or outer locating notches so as to lock the fold frame bar mounting structure in the operative or collapsed position. The first connecting frame is covered with a rubber on the rear end thereof therefore, no noise will be produced when it is moved relative to the second connecting frame.

DETAILED DESCRIPTION OF THE PREFERRED EMBODIMENT

Referring to FIGS. 6 through 11, a folding frame assembly for a golf cart as constructed in accordance with the present invention is generally comprised of a folding frame bar mounting structure and a telescopic drag bar mounting structure.

Referring to FIGS. 9, 10A, 10B and 11, the telescopic drag bar mounting structure is generally comprised of a mounting device 1, a swinging block 2, a positioning member 3, an adjusting device 4, a drag bar 5 and a frame bar 6. The mounting device 1 is comprised of two opposite mounting shells 11, 12 and a plurality of fastening elements 13. The two opposite mounting shells 11, 12 comprise each an unitary, rectangular connecting portion 111 or 121 vertically downwardly extended from a substantially U-shaped holder portion 110 or 120 for connecting a frame bar 6, which is a part of the frame of a golf cart to which the drag bar of the present invention is secured. A plurality of mounting holes 112 or 122 are made on the connecting portion 111 of each of the two opposite mounting shells 11, 12 so that a corresponding quantity of fastening elements 13 can be inserted therethrough to secure the two opposite mounting shells 11, 12 together. An unitary pin 16 extends from the inner wall of the connecting portion 111 or 121 of each mounting shell 11 or 12 for fastening to the frame bar 6. The holder portion 110, 120 of the mounting shells 11 or 12 has a notch 113 or 123 on its topmost edge, and a transversely curved, raised strip 14, a circular guide post 117, a rectangular hole 15 and a plurality of radial, convex strips 118 on its inner wall. The swinging block 2 is a substantially elongated block integrally made of resilient plastic material through shape molding process having a key hole 22 vertically and laterally piercing therethrough, a guide post hole 116 transversely piercing therethrough at a lower position, a pivot hole 220 transversely piercing therethrough at a higher position near one lateral side, two curved grooves 21 transversely made on its two opposite side walls, and a plurality of concave strips 119 radially made on its two opposite side walls and respectively intersecting with the two curved grooves 21. The two curved grooves 21 are made in width slightly wider than the thickness of the transversely curved, raised strips 14 of the two opposite mounting shells 11, 12. The positioning member 3 comprises a tubular body having a conical bottom end 33, a rectangular flange 32 and a rivet hole 31. After the swinging block 2 is mounted on the drag bar 5, the positioning member 3 is inserted in the drag bar 5 and fixedly secured therein by means of a rivet 531 which is fastened in the drag bar 5 through a rivet hole 31. The adjusting device 4 is comprised of a swivel knob 41 and a screw rod 42. The screw rod 42 is inserted from the rectangular hole 15 of a first mounting shell 11 or 12 through the pivot hole 220 of the swinging block 2 and the rectangular hole 15 of the other mounting shell 11 or 12 to connect with the swivel knob 41. During the fastening of the adjusting device 4, a washer 7 is mounted on the screw rod 42 to reduce possible wearing problems. By means of the control of the adjusting device 4, the swinging block 2 can be firmly squeezed or released so that the positioning of the drag bar 5 inside the two holder portions 110, 120 of the two opposite mounting shells 11, 12 and relative to the frame bar 6 can be conveniently adjusted. By means of the control of the swivel knob 41, the position of the drag bar 5 is adjusted.

Referring to FIG. 6, 7, 8A and 8B, the folding frame bar mounting structure is generally comprised of a frame bar 6, a first connecting frame 63, a second connecting frame 65, a locating device 62, a control knob 60, a spring 66, a wheel holder assembly 83, two links 67, a first bag cradle 84, and a second bag cradle 86. The frame bar 6 has a front end connected to the aforesaid drag bar 5 and a rear end mounted with the first connecting frame 63. The first connecting frame 63 comprises two parallel side walls 631 bridged over the frame bar 6 and respectively terminating in a circular bottom edge 6311, two inner locating notches 6312 and two outer locating notches 6313 respectively made on the side walls 631 at two opposite locations, a rubber 630 covered on a rear end. 632 thereof and stopped against the second connecting frame 65 when the folding frame bar mounting structure is set in the working position, and two lugs 633 respectively extended from the side walls 631 to hold the links 67. The second connecting frame 65 is fastened to the front end of the frame member 6, having two parallel side walls 651 bilaterally pivotally connected to the two parallel side walls 631 of the first connecting frame 63 by a tube 653 and a screw bolt 654. Two sliding slots 6511 are aligned on the parallel side walls 651 of the second connecting frame 65. The control knob 60 has a bottom end 601 inserted through a hole (not shown) on the top wall 655 of the second connecting frame 65 and connected to the locating device 62. The spring 66 is mounted around the control knob 60 and retained between the top wall 655 of the second connecting frame 65 and the locating device 62. The locating device 62 comprises two opposite locating rods 621 respectively inserted through the sliding slots 6511 on the second connecting frame 65 and moved engage into the inner locating notches 6312 or the outer locating notches 6313 on the parallel side walls 631 of the first connecting frame 63.

Figure 8A:
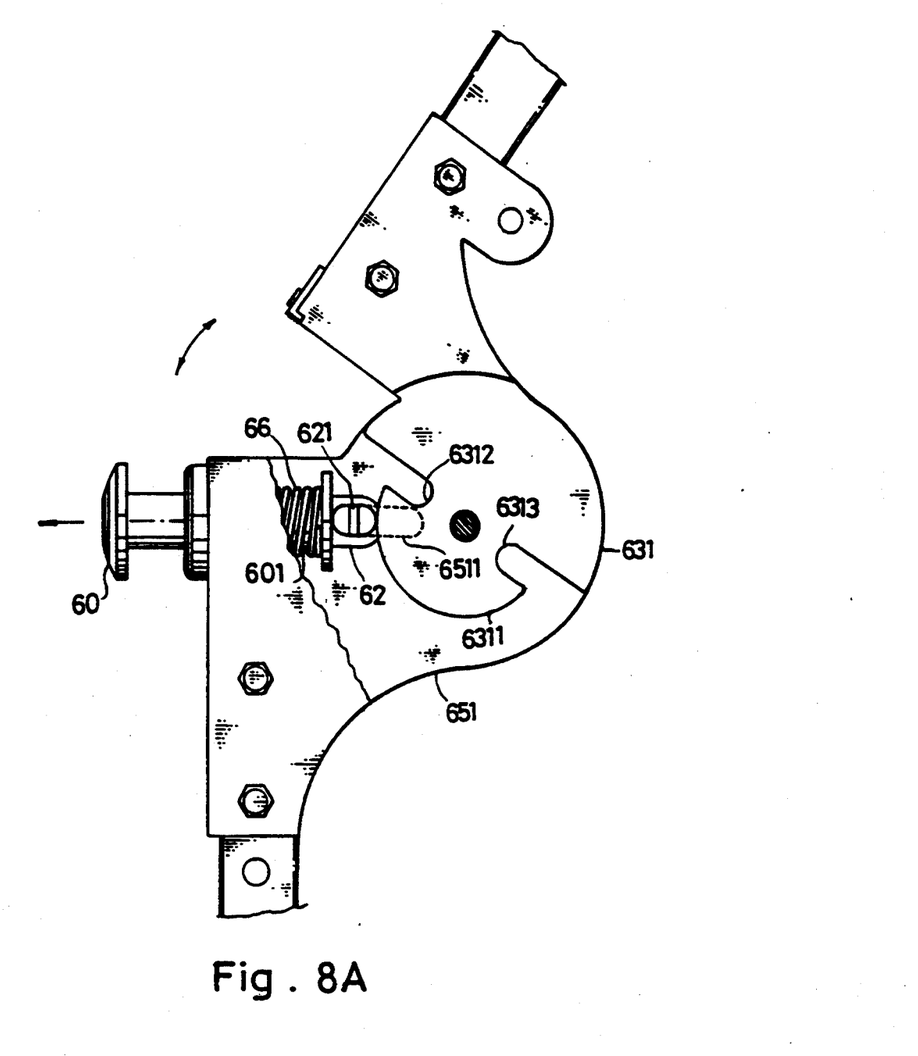
FIG. 8A shows the locating rods of the locating device of the folding frame bar mounting structure of FIG. 7 released from the inner locating notches of the first connecting frame thereof.
Figure 8B:
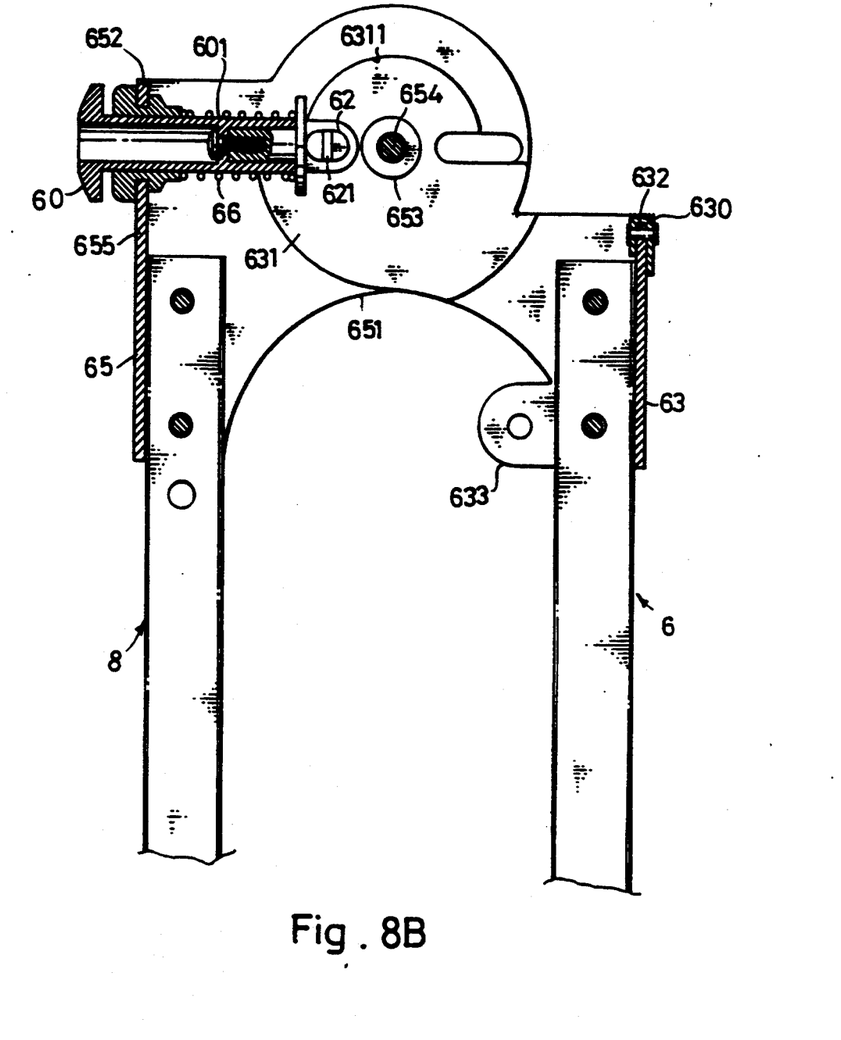
FIG. 8B shows the folding frame bar mounting structure of FIG. 7 locked in the collapsed position.
Figure 9:
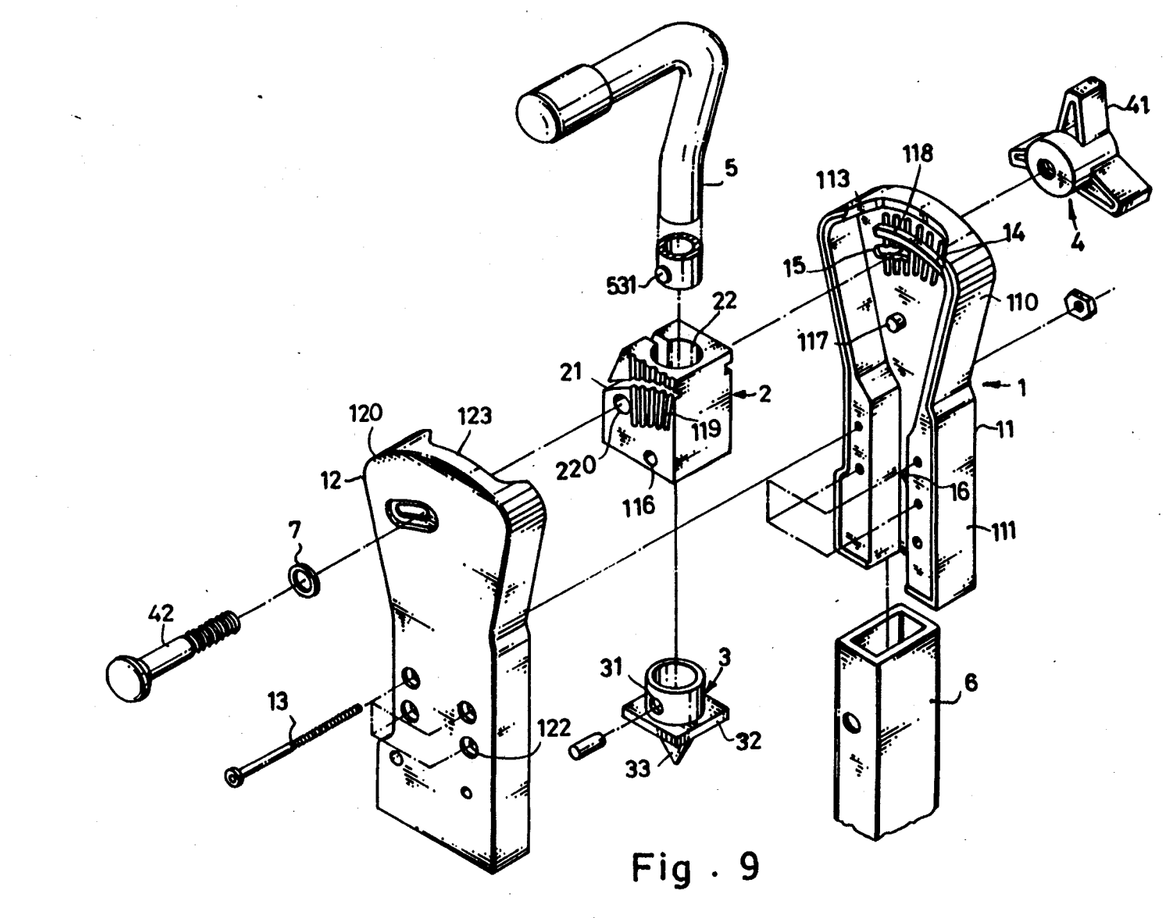
FIG. 9 is a perspective exploded view of the telescopic drag bar mounting structure of the golf cart folding frame assembly shown in FIG. 6.
Figure 10A:
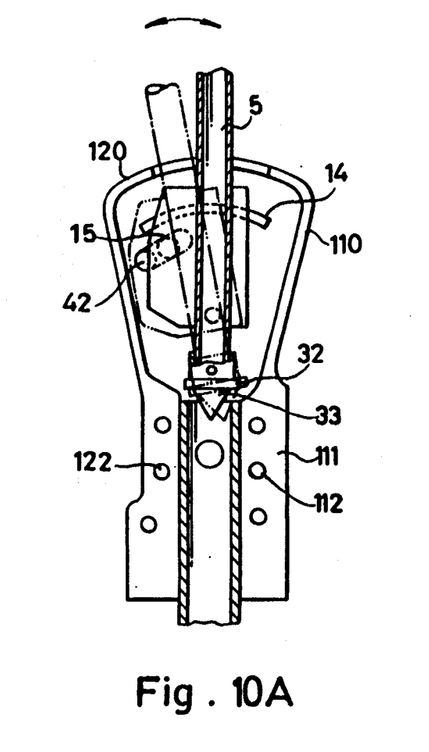
FIGS. 10A and 10B illustrate the operation of the present invention to adjust the position of the drag bar.
Figure 10B:
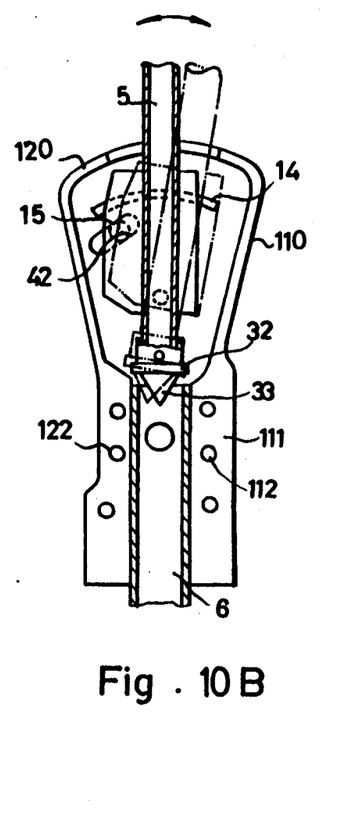
Figure 11:
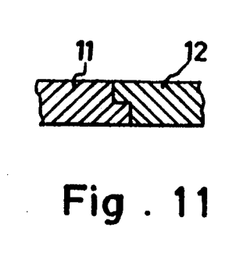
FIG. 11 is a sectional end view illustrating the connection of the two opposite mounting shells of the mounting device of the telescopic drag bar mounting structure of the present invention.

The folding frame bar mounting structure can be conveniently folded up into the collapsed, nonoperative condition by pulling the control knob 60 from the second connecting frame 65 to release the locating rods 621 of the locating device 62 from the inner locating notches 6312 and then turning the frame bar 6 backward toward the frame member 8 (see FIG. 8A). When the frame bar 6 is turned backward, the wheel holder assembly 83 is simultaneously moved by the link into the collapsed condition. When collapsed, the locating rods 621 of the locating device 62 are engaged into the outer locating notches 6313 of the first connecting frame 63 to lock the folding frame bar mounting structure in the collapsed position (see FIG. 8B). By pulling the control knob 60 from the second connecting frame 65 to release the locating rods 621 of the locating device 62 from the outer locating notches 6313 and then turning the frame bar 6 outwardly forward to become longitudinally aligned with the frame member 8, the locating rods 621 are engaged into the inner locating notches 6312 to lock the folding frame bar mounting structure in the operative position (see FIG. 7).

I claim:

1. A golf cart folding frame assembly comprised of a folding frame bar mounting structure and a drag bar mounting structure, the folding frame bar mounting structure comprising a frame bar having a front end coupled to a drag bar and a rear end connected with a first connecting frame, a first bag cradle mounted on said frame bar, a frame member having a front end connected with a second connecting frame and a rear end mounted with a second bag cradle, a wheel holder assembly mounted on said frame member, two links pivotally connected between said wheel holder assembly and said first connecting frame, a control knob mounted in a hole on said second connecting frame, a locating device connected to said control knob and controlled to alternatively lock said folding frame bar mounting structure in the operative or non-operative position, said first connecting frame having an inner pair of locating notches and an outer pair of locating notches on two opposite, arched side walls thereof and a rubber covered on a rear end of said first connecting frame, said second connecting frame having two opposite sliding slots on two opposite side walls thereof, a spring mounted around said control knob and retained between said locating device and said second connecting frame, said locating device having two opposite locating rods respectively inserted through the sliding slots on said second connecting frame and engaged into said inner locating notches to lock the folding frame bar mounting structure in the operative position, and wherein the folding frame bar mounting structure can be conveniently folded up into the collapsed, non-operative position by pulling said control knob from said second connecting frame to release said locating rods of said locating device from said inner locating notches and then turning said frame bar backward toward said frame member permitting said locating rods to engage into said outer locating notches.

* * * * *